United States Patent [19]
Tsai

[11] Patent Number: 6,139,332
[45] Date of Patent: Oct. 31, 2000

[54] SWIVEL CONNECTOR

[76] Inventor: A-Ming Tsai, 2F., No.2, Lane 142, Chung Yang N. Rd. Sec.4, Pei Tou District, Taipei, Taiwan

[21] Appl. No.: 09/357,714

[22] Filed: Jul. 20, 1999

[51] Int. Cl.[7] .................................................. H01R 39/00
[52] U.S. Cl. ............................................ 439/21; 439/638
[58] Field of Search ............................... 439/21, 22, 638, 439/676, 17–20, 29, 344, 650–654

[56] References Cited

U.S. PATENT DOCUMENTS

| | | | |
|---|---|---|---|
| 4,593,966 | 6/1986 | Meyer | 439/676 |
| 5,082,448 | 1/1992 | Kang | 439/21 |

*Primary Examiner*—Renee Luebke
*Assistant Examiner*—Antoine Ngandjui
*Attorney, Agent, or Firm*—Pro-Techtor International Services

[57] ABSTRACT

A swivel connector including a first and a second receptacle connected to each other by an intermediate plug that has an end rotatably mounted to an inner end of the first receptacle and another end plugged into the second receptacle. A circular disc having concentrically arranged conducting rings is mounted to an end of the intermediate plug to electrically connect at one side to conductors arranged in the first receptacle and at the other side to conducting strips arranged in the other end of the intermediate plug. The second receptacle has conductors arranged therein to extend their two ends separately into two jacks provided at two ends of the second receptacle. A subsidiary cord having a suitable length and two plugs provided at two ends thereof is connected at one end to one jack on the second receptacle and at another end to a jack on a handset, so that a phone cord connected to the first receptacle would not tangle and the swivel connector would not easily collide with the telephone set when a user hangs up the handset.

2 Claims, 7 Drawing Sheets

SWIVEL CONNECTOR

BACKGROUND OF THE INVENTION

The present invention relates to a connector, and more particularly to a swivel connector for connecting a phone cord to a handset to prevent the phone cord from becoming tangled.

FIGS. 1 and 2 are exploded perspective and sectional side view, respectively, of a conventional swivel connector. As shown, the conventional swivel connector mainly includes a receptacle 1, a circular disc 2, and a plug 3.

The receptacle 1 includes a generally half-oval shaped housing. A space is provided at one side of the housing for receiving a conductor holder 11 therein, so that a jack 13 is formed at an outer end of the receptacle 1 for a phone cord 62 to plug thereinto (see FIG. 3). An inner end of the receptacle 1 is diametrically widened to define an open space in which a plurality of spaced conducting springs 14 are fixedly arranged to each electrically contact at one end with a corresponding conductor 12 seated in the conductor holder 11.

A side surface of the circular disc 2 facing toward the receptacle 1 has a plurality of differently sized conducting rings 21 fixedly concentrically spaced thereon. The other side surface of the circular disc 2 has a plurality of conducting springs 22 arranged thereon such that each conducting spring 22 corresponds to and electrically contacts with one conducting ring 21 at opposite side of the circular disc 2.

The plug 3 is similar to a general phone cord plug. A rear end of the plug 3 that faces toward the receptacle 1 has a diametrically expanded circular wall 31 for rotatably setting in the open space of the receptacle 1. The circular wall 31 defines an inner space into which the circular disc 2 is fitted. A plurality of conducting strips 32 are arranged in the plug 3, such that each conducting strip 32 corresponds to and electrically contacts with one conducting spring 22 fixed on the circular disc 2. A washer 33 and a C-ring 34 are sequentially fixed around an outer periphery of the circular wall 31 to firmly locate the plug 3 in the open space of the receptacle 1.

In the above-described conventional swivel connector, it is the circular disc 2 that electrically connects the conducting strips 32 in the plug 3 to the conductors 12 in the jack 13 of the receptacle 1 for the swivel connector to provide the function of electrical connection. And, since the plug 3 is rotatably fitted in the receptacle 1, the jack 13 is allowed to rotate relative to the plug 3. Whereby when the plug 3 of the swivel connector is plugged into a jack 61 provided on a handset 6 and a plug 63 at a front end of the phone cord 62 is plugged into the jack 13 on the receptacle 1 of the swivel connector, as shown in FIG. 3, the cord 62 is allowed to rotate relative to the handset 6 without becoming tangled. However, following drawbacks are found in the above-described conventional swivel connector:

1. The receptacle 1 is dimensionally larger than the plug 3. When the plug 3 is plugged into the jack 61 on the handset 6, the receptacle 1 would inevitably contact with or even undesirably press against a telephone set 7, preventing the handset 6 from correctly locating on the telephone set 7. And, whenever a user hangs up the handset 6, the receptacle 1 tends to collide with the telephone set 7 and becomes damaged or causes poor electrical contact. The conventional swivel connector is therefore inconvenient for use and has shortened usable life.

2. The jack 13 at one end of the receptacle 1 inclinedly extends into the receptacle 1 and tends to prevent the receptacle 1 and accordingly the cord 62 from smoothly rotating relative to the plug 3. The conventional swivel connector therefore has less effective swivel function.

3. The jack 61 on the handset 6 usually has a depth that varies with telephones of different manufacturer. On the other hand, the plug 3 usually has a fixed length. There are times the plug 3 is either too short or too long compared to the depth of the jack 61. In the case of a too short plug 3, the swivel connector might completely lose its connection function. It is therefore tried by the inventor to develop an improved swivel connector that eliminates the drawbacks existing in the conventional swivel connector and can be plugged into a jack either on the handset 6 or on the telephone set 7.

SUMMARY OF THE INVENTION

A primary object of the present invention is to provide a swivel connector that is connected to one end of a phone cord for plugging into a jack either on a handset or a telephone set without easily colliding with the handset or the telephone set and becoming damaged.

To achieve the above and other objects, the present invention mainly includes a first receptacle having an intermediate plug rotatably mounted to and forward projected from an inner end thereof, a second receptacle into one end of which the intermediate plug is plugged, and a subsidiary cord having plugs provided at both ends for separately plugging into a jack formed on the second receptacle and a jack on the handset or the telephone set. To allow the first receptacle and the subsidiary cord to electrically connect to one another, the second receptacle has conductors arranged therein such that two ends of the conductors separately extend into jacks provided at two ends of the second receptacle. The subsidiary cord has a suitable length to always keep the second receptacle connected thereto away from the handset or the telephone set by a safe distance without easily colliding with either of them when a user hangs up the handset.

BRIEF DESCRIPTION OF THE DRAWINGS

The above objects, the features, and the effects of the present invention can be best understood by referring to the following detailed description of the preferred embodiments and the accompanying drawings, wherein.

DETAILED DESCRIPTION OF THE PREFERRED EMBODIMENTS

Figure 1:
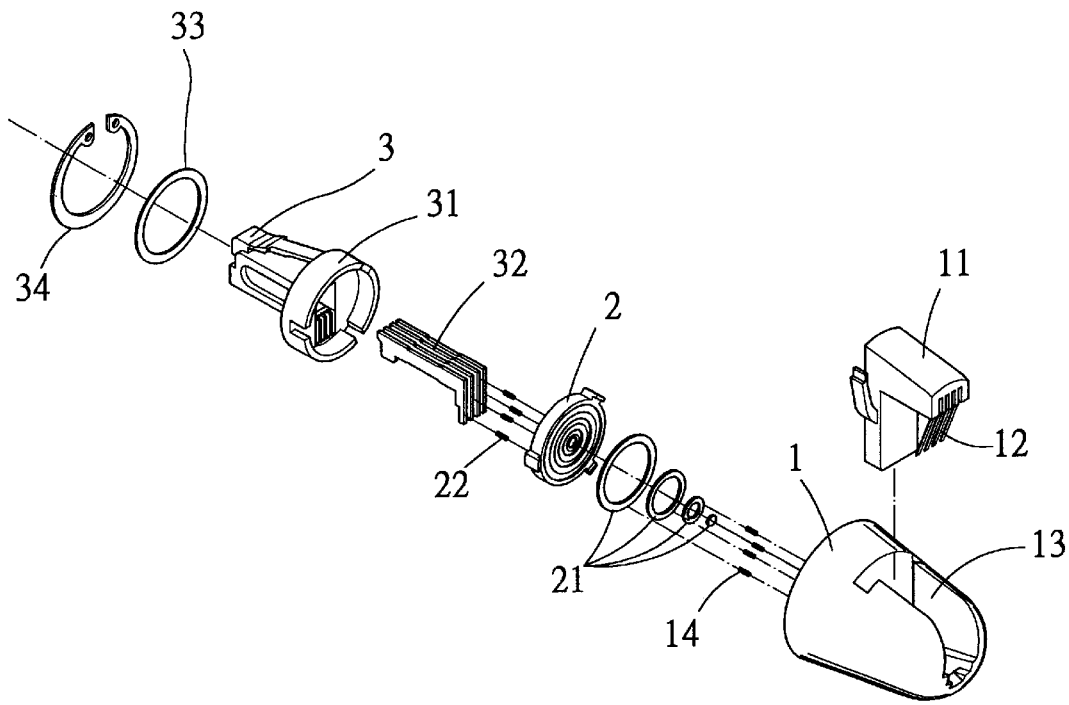
FIG. 1 is an exploded perspective of a conventional swivel connector.
Figure 2:
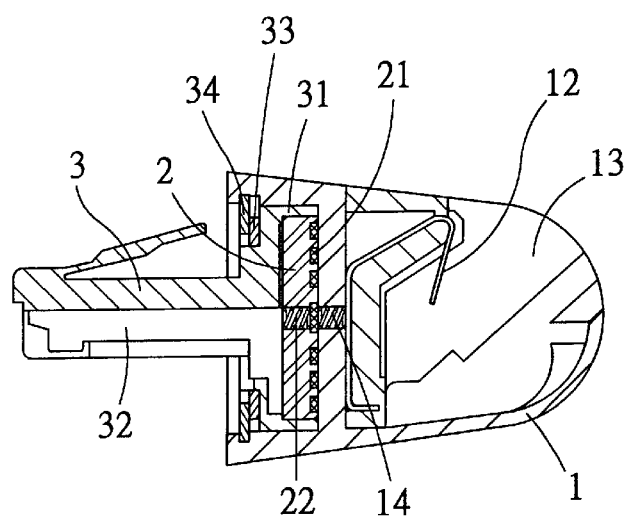
FIG. 2 is an assembled sectional side view of the conventional swivel connector of FIG. 1.
Figure 3:
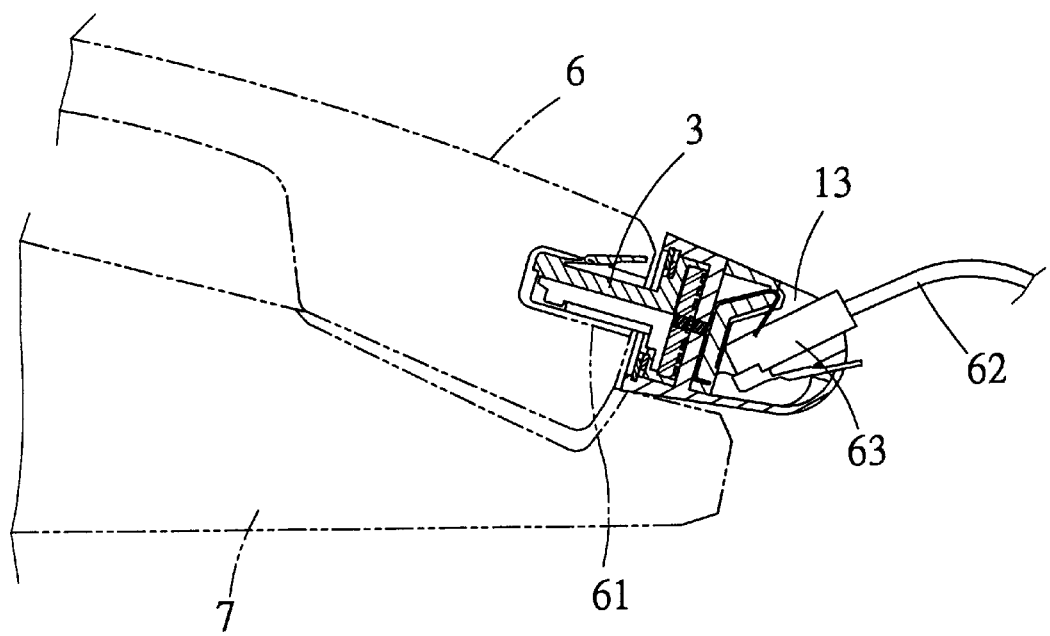
FIG. 3 schematically illustrates the manner in which the conventional swivel connector of FIG. 1 is plugged into a jack provided on a handset.
Figure 4:
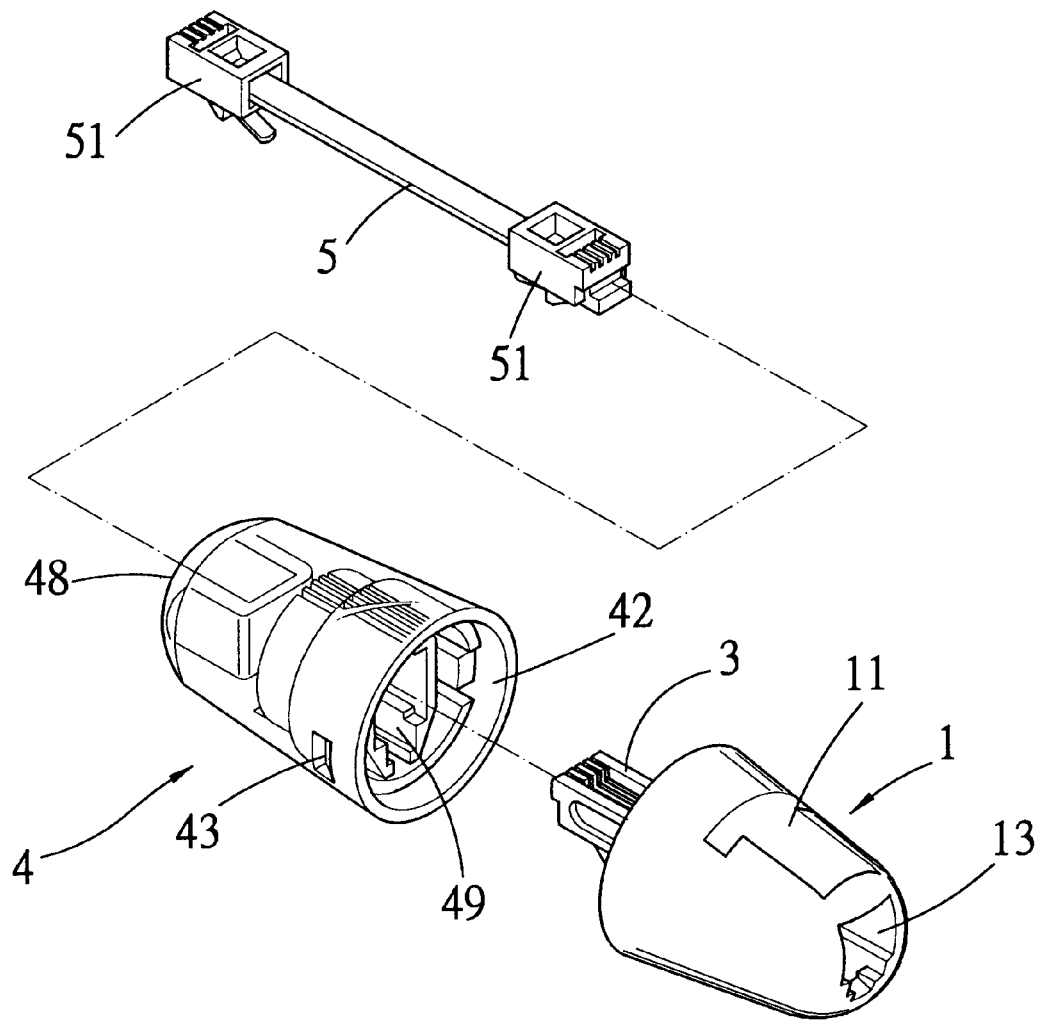
FIG. 4 is a partially exploded perspective of a swivel connector according to the present invention.

Please refer to FIG. 4 that is a partially exploded perspective of a swivel connector according to the present invention. As shown, the swivel connector mainly includes a first receptacle 1 that may be a connector 1 of the conventional swivel connector shown in FIGS. 1 and 2, a second receptacle 4 connected to an inner end of the first receptacle 1, and a subsidiary cord 5 having phone cord plugs 51 provided at both ends thereof.

Figure 5:
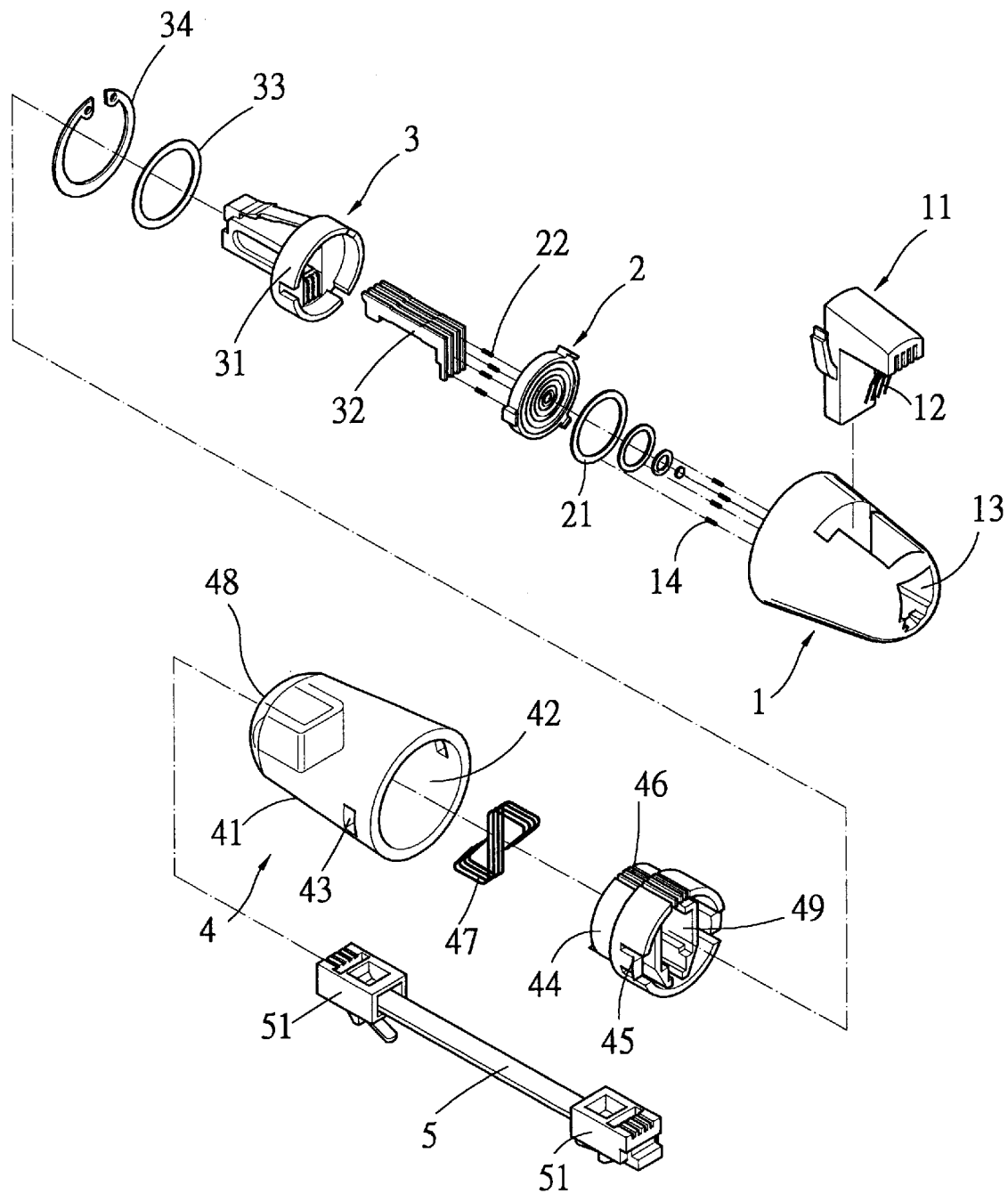
FIG. 5 is a fully exploded perspective of the swivel connector of FIG. 4.
Figure 6:
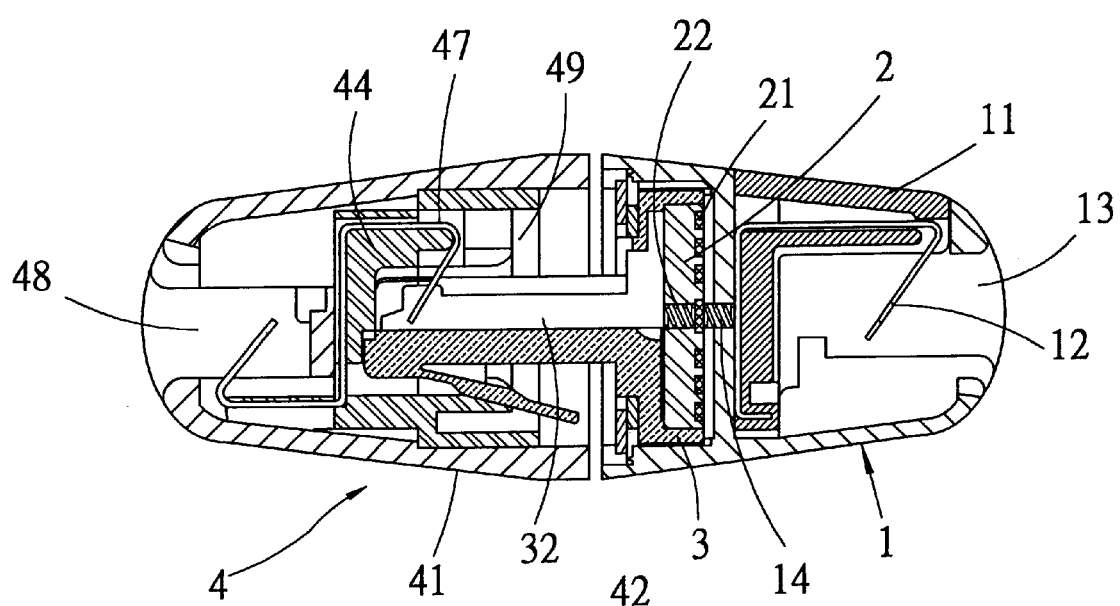
FIG. 6 is an assembled sectional side view of the swivel connector of FIG. 4.

FIGS. 5 and 6 are fully exploded perspective and assembled sectional side view, respectively, of the swivel connector of the present invention. As shown, the first receptacle 1 includes a generally half-oval shaped housing. A space is provided at one side of the housing for receiving a first conductor holder 11 therein, so that a first jack 13 is formed at an outer end of the first receptacle 1. A cord 62 (not shown in FIGS. 5 and 6) may be plugged into the first jack 13. An inner end of the first receptacle 1 is diametrically widened to define an open space in which a plurality of spaced conducting springs 14 are fixedly arranged to each electrically contact at one end with a corresponding first conductor 12 seated in the conductor holder 11. An intermediate plug 3 is rotatably mounted in the open space of the first receptacle 1, and a circular disc 2 is mounted to a rear end of the intermediate plug 3 facing toward the first receptacle 1.

A side surface of the circular disc 2 facing toward the first receptacle 1 has a plurality of differently sized conducting rings 21 fixedly concentrically spaced thereon. The other side surface of the circular disc 2 has a plurality of conducting springs 22 arranged thereon such that each conducting spring 22 corresponds to and electrically contacts with one conducting ring 21 at opposite side of the circular disc 2.

The intermediate plug 3 has a front end similar to a general phone cord plug. The rear end of the intermediate plug 3 that faces toward the first receptacle 1 has a diametrically expanded circular wall 31 for rotatably setting in the open space of the first receptacle 1. The circular wall 31 defines an inner space into which the circular disc 2 is fitted. A plurality of conducting strips 32 are arranged in the intermediate plug 3, such that each conducting strip 32 corresponds to and electrically contacts with one conducting spring 22 fixed on the circular disc 2. A washer 33 and a C-ring 34 are sequentially fixed around an outer periphery of the circular wall 31 to firmly locate the intermediate plug 3 in the open space of the first receptacle 1.

The second receptacle 2 includes a housing 41 that preferably has an outer configuration corresponding to that of the first receptacle 1 to give the whole swivel connector of the present invention an attractive appearance. The housing 41 has an inner end 42 that faces toward the first receptacle 1 and defines an inner space for receiving a second conductor holder 44 therein. For the second conductor holder 44 to firmly locate in the inner end 42 of the housing 41, catch holes 43 are provided at two diametrically opposite points near the inner end 42 and retaining ears 45 are correspondingly provided at two diametrically opposite points of the second conductor holder 44 to engage into the catch holes 43. As can be clearly seen in FIG. 5, a plurality of long slots 46 are cut on the second conductor holder 44 at positions generally between the two retaining ears 45 to axially extend a full length of the second conductor holder 44. In each long slot 46, there is received a second conductor 47. An outer end of the housing 41 facing away from the first receptacle 1 is formed into a second jack 48, and an end of the second conductor holder 44 facing toward the first receptacle 1 is formed into a third jack 49. The second conductor 47 each has an end projected into the second jack 48 and another end projected into the third jack 49. That is, the second and the third jacks 48, 49 use common conductors 47 extended between them.

When the first receptacle 1 is connected to the second receptacle 4 by plugging the intermediate plug 3 into the third jack 49, the second conductors 47 separately electrically contact with the conducting strips 32 that are seated in the intermediate plug 3 and forward projected from the inner end of the first receptacle 1. And, the subsidiary cord 5 is electrically connected to the second receptacle 4 by plugging one plug 51 at one end thereof into the second jack 48 to contact with the second conductors 47.

With the above-described arrangements, the intermediate plug 3 is rotatable relative to the first receptacle 1, the second receptacle 4 fixedly connected to the intermediate plug 3 and the subsidiary cord 5 fixedly connected to the second receptacle 4 are therefore allowed to freely rotate along with the intermediate plug 3 relative to the first receptacle 1.

Figure 7:
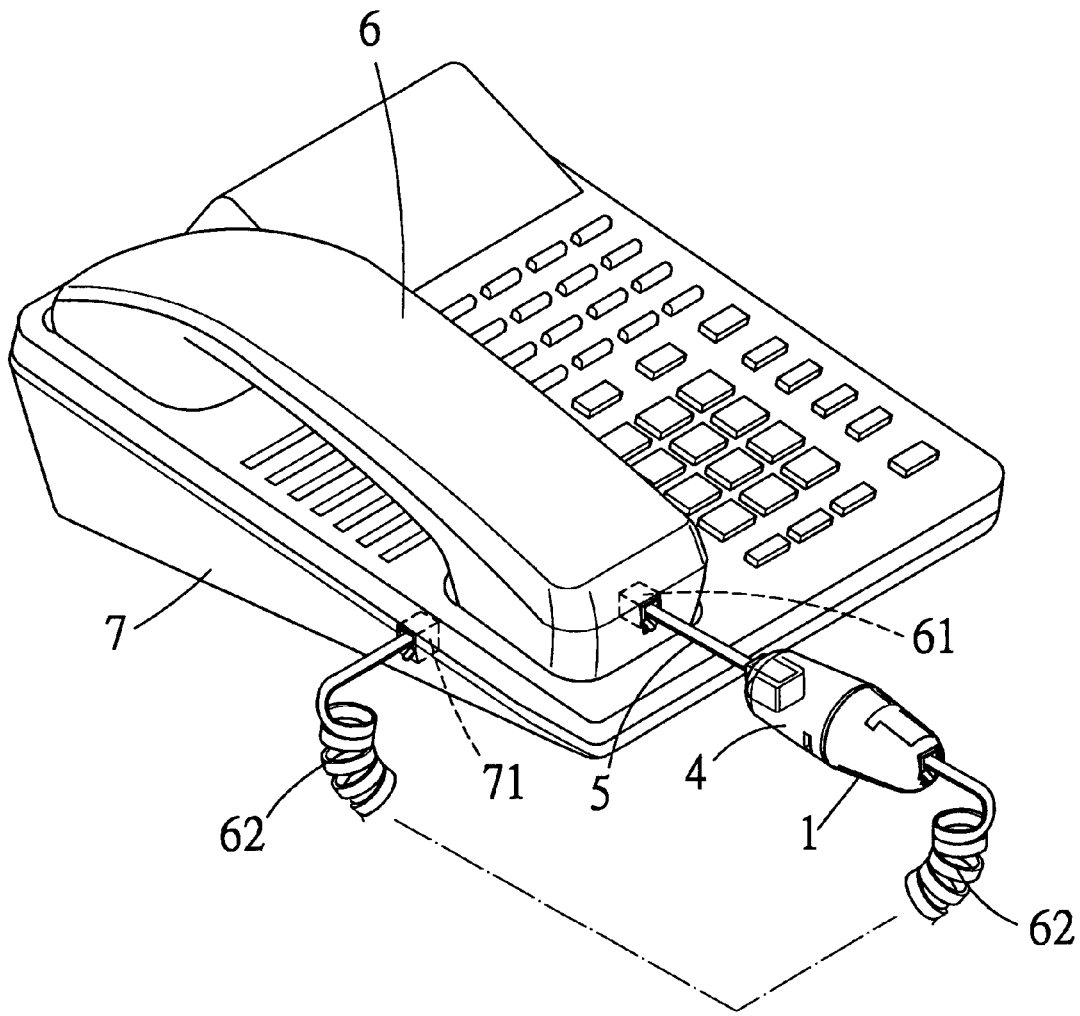
FIG. 7 illustrates the manner in which the swivel connector of the present invention is plugged into a jack provided on a handset.

FIG. 7 schematically illustrates an example of the use of the swivel connector of the present invention. As shown, The subsidiary cord 5 has one plug 51 at one end thereof plugged into a jack 61 provided on a handset 6 and the other plug 51 at the other end thereof plugged into the second jack 48 of the second receptacle 4, and the first receptacle 1 opposite to the subsidiary cord 5 is connected to a cord 62. The subsidiary cord 5 keeps an assembly of the first and the second receptacles 1, 4 away from the handset 6 by a suitable distance to avoid any undesired collision of the swivel connector with the telephone set 7 when the handset 6 is put down on the telephone set 7.

Figure 8:
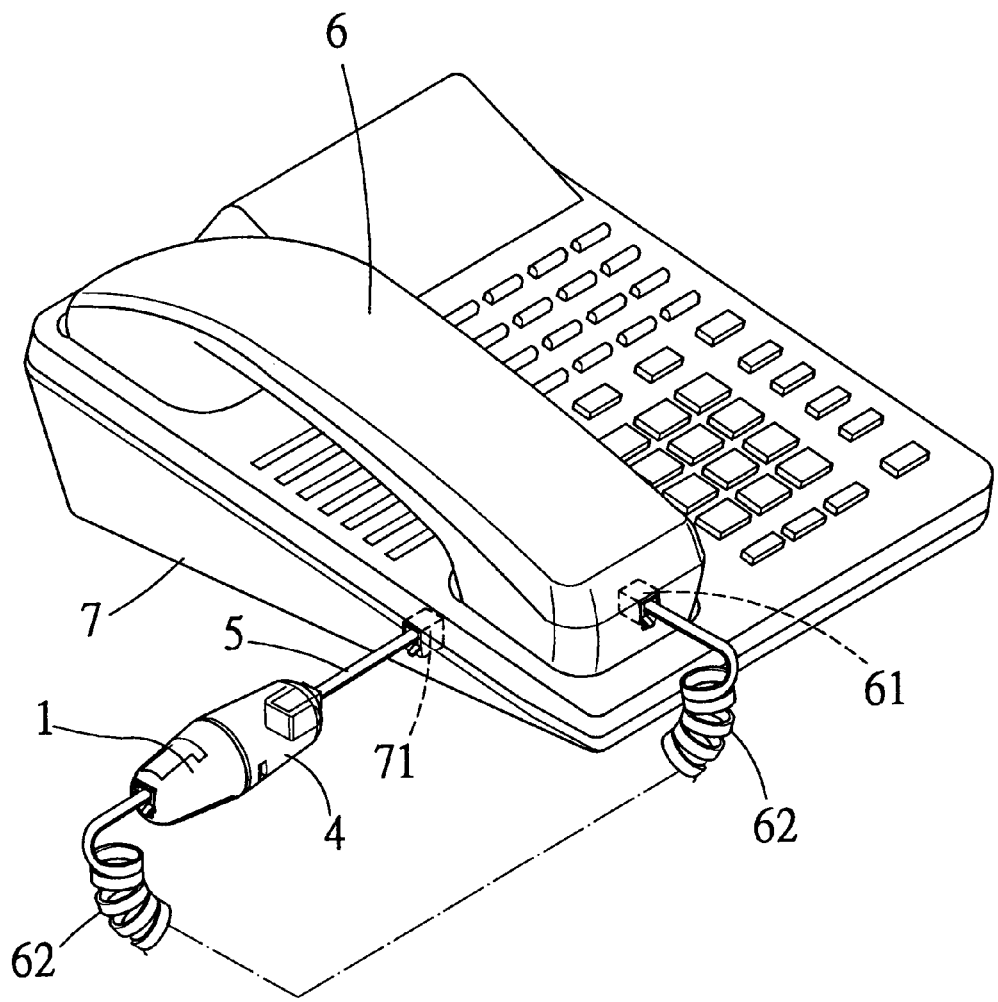
FIG. 8 illustrates the same swivel connector of the present invention is plugged into a jack provided on the telephone set.

The swivel connector of the present invention is not limited to the use between the handset 6 and the cord 62. FIG. 8 illustrates another example of the use of the present invention. In this example, the subsidiary cord 5 has one plug 51 thereof plugged into a jack 71 provided on the telephone set 7 and the cord 62 has one end directly connected to the jack 61 on the handset 6. Again, the handset 6 would not collide with the swivel connector when a user puts it down on the telephone set 7.

Following are the major features of the present invention:

1. The swivel connector of the present invention would not collide with the handset 6 or the telephone set 7 when the handset 6 is put down onto the telephone set 7. The swivel connector is not easily subject to damage and can therefore always maintain in a good working condition.
2. The first and the second jacks 13, 48 are always in a line without adversely affecting the rotation of the intermediate plug 3 relative to the first receptacle 1. The swivel connector of the present invention can therefore always keep the cord 62 from becoming tangled.
3. The subsidiary cord 5 is adaptable to all types of jacks 61 or 71 that might have a depth varying with telephone sets of different manufacturers.

What is to be noted is the form of the present invention shown and disclosed is to be taken as a preferred embodiment of the invention. Various changes in the shape, size, and arrangements of parts may be resorted to without departing from the spirit of the invention or the scope of the subjoined claims.

What is claimed is:

1. A swivel connector for connecting a phone cord to a jack on a handset or a telephone set to prevent the cord from tangling, comprising a first receptacle, a second receptacle, and a subsidiary cord;

said first receptacle includes at an outer end a first jack to receive said phone cord and at an inner end an open space in which an intermediate plug is mounted, said intermediate plug rotates relative to said first receptacle; a circular disc being mounted at a first end of said intermediate plug, a plurality of differently sized conducting rings being concentrically arranged on said circular disc on one surface facing toward said first receptacle, said conducting rings being electrically connected at one side to first conductors arranged in said first jack on the outer end of said first receptacle and at the other side to conducting strips arranged in said intermediate plug;

said second receptacle being provided with a second and a third jack, respectively, second conductors being arranged in said second receptacle with two ends thereof separately extending into said second and said third jacks; said intermediate plug being connected to said second receptacle by plugging a forward projected end of said intermediate plug into said third jack of said second receptacle and thereby electrically connecting said second receptacle to said first receptacle; an inner end of said second receptacle having a cross section matching a cross section of an inner end of said first receptacle so that said first receptacle and said second receptacle have a continuous contour when said first receptacle is joined with said second receptacle; and said subsidiary cord being provided at each of two ends with a phone cord plug, such that said subsidiary cord is connected to said second receptacle by plugging a first plug thereof into said second jack of said second receptacle, and to said telephone set by plugging a second plug thereof into said jack on said handset or said telephone set; and said subsidiary cord having a length that keeps said first and said second receptacles away from said handset and said telephone set.

2. The swivel connector as claimed in claim 1, wherein said second receptacle defines an inner space into which a conductor holder is fixedly mounted so that said third jack of said second receptacle is formed at an end of said conductor holder, said conductor holder being provided with long slots that axially extend a full length of said conductor holder, each of said long slots receiving one of said second conductors arranged in said second receptacle, such that ends of said second conductors extend into said second and said third jacks; and said conductor holder being provided at two diametrically opposite points with two retaining ears that engage two catch holes on a housing of said second receptacle.

* * * * *